US007720728B2

(12) United States Patent
Hayashi

(10) Patent No.: US 7,720,728 B2
(45) Date of Patent: May 18, 2010

(54) COMPENSATION CONTRACT SUPPORTING SYSTEM, METHOD FOR SUPPORTING COMPENSATION CONTRACT, AND PROGRAM THEREOF

(75) Inventor: Katsunobu Hayashi, Tokyo (JP)

(73) Assignee: Mitsui Sumitomo Insurance Co., Ltd. (JP)

( * ) Notice: Subject to any disclaimer, the term of this patent is extended or adjusted under 35 U.S.C. 154(b) by 2199 days.

(21) Appl. No.: 09/683,829

(22) Filed: Feb. 20, 2002

(65) Prior Publication Data

US 2002/0116303 A1    Aug. 22, 2002

(30) Foreign Application Priority Data

Feb. 22, 2001    (JP) .............................. 2001-046535

(51) Int. Cl.
*G06Q 40/00* (2006.01)
(52) U.S. Cl. ...................................... 705/35
(58) Field of Classification Search .................. 705/35, 705/36 R, 38; 707/1, 100
See application file for complete search history.

(56) References Cited

U.S. PATENT DOCUMENTS 6,009,402 A * 12/1999 Whitworth ...................... 705/4
6,856,969 B1 * 2/2005 Hache ........................ 705/36 R 2003/0208422 A1 * 11/2003 Burczyk ...................... 705/35

OTHER PUBLICATIONS

Pearson et al., "The Determinants of Monitoring Cost in not-for-profit Organizations", Journal of Public Budgeting, Accounting & Financial Management, v10n4, pp. 499-512, Winter 1998.*
Japanese Examiner's Office action of June 11, 2004 in related Japanese application, including English language translation thereof, p. 20 translated.
Engineering "Dynamism of Financial" pp. 30-41.
Japanese Examiner's Office action of Jun. 11, 2004 in related Japanese application, including English language translation thereof.

* cited by examiner

*Primary Examiner*—Mary Cheung
(74) *Attorney, Agent, or Firm*—Hershkovitz & Associates, LLC; Abraham Hershkovitz

(57) ABSTRACT

A compensation contract supporting system that supports a compensation contract which provides a customer compensation for a profit risk created by a plurality of risk factors that influence a profit of the customer, comprising: a database for storing statistical data of the plurality of risk factors; a first probability calculation unit for calculating a probability, in which a part of the plurality of the risk factors satisfy a predetermined first condition, and a probability, in which remaining plurality of the risk factors satisfying a predetermined second condition using the database, and at least one of the first condition and the second condition being a non-financial condition that is not related to a financial product; and a ratio calculation unit for calculating a ratio between a first compensation amount to be paid or received by the customer when the part of the risk factors satisfy the first condition and a second compensation amount to be paid or received by the customer when the remaining risk factors satisfy the second condition using the probability calculated by the first probability calculation unit.

13 Claims, 9 Drawing Sheets

FIG. 2

| WEATHER (TOKYO) | | | | |
|---|---|---|---|---|
| YEAR/MONTH/DAY | WEATHER | AMOUNT OF RAINFALL | AMOUNT OF SNOWFALL | ... |
| ... | ... | ... | ... | ... |
| 2000/11/21 | CLOUDY | 0 | 0 | ... |
| 2000/11/22 | FAIR | 0 | 0 | ... |
| ... | ... | ... | ... | ... |

NATURAL DISASTER

ECONOMIC INDICATORS

220

240

| NIKKEI STOCK AVERAGE | |
|---|---|
| YEN/DOLLAR EXCHANGE RATE | |
| YEAR/MONTH/DAY | EXCHANGE RATE (YEN/DOLLAR) |
| ⋮ | ⋮ |
| 2000/11/20 | 109.00 |
| 2000/11/21 | 109.50 |
| ⋮ | ⋮ |

FIG. 3

| CONTRACT NUMBER | CUSTOMER NAME | FACTOR | | CONDITION |
| --- | --- | --- | --- | --- |
| | | FIRST FACTOR | SECOND FACTOR | |
| 1 | A CORPORATION | PRECIPITATION | YEN/DOLLAR EXCHANGE | ..... |
| 2 | B CORPORATION | TEMPERATURE | YEN/DOLLAR EXCHANGE | ..... |
| ..... | ..... | ..... | ..... | ..... |

(UNIT:ONE MILLION YEN)

| | | \multicolumn{11}{c}{AVERAGE TEMPERATURE (STRIKE DEGREE=25°C)} |
|---|---|---|---|---|---|---|---|---|---|---|---|---|
| | | 20 | 21 | 22 | 23 | 24 | 25 | 26 | 27 | 28 | 29 | 30 |
| YEN/DOLLAR RATE (STRIKE PRICE=100YEN/DOLLAR) | 90 | 60 | 40 | 20 | 0 | -20 | -40 | -40 | -40 | -40 | -40 | -40 |
| | 91 | 64 | 44 | 24 | 4 | -16 | -36 | -36 | -36 | -36 | -36 | -36 |
| | 92 | 68 | 48 | 28 | 8 | -12 | -32 | -32 | -32 | -32 | -32 | -32 |
| | 93 | 72 | 52 | 32 | 12 | -8 | -28 | -28 | -28 | -28 | -28 | -28 |
| | 94 | 76 | 56 | 36 | 16 | -4 | -24 | -24 | -24 | -24 | -24 | -24 |
| | 95 | 80 | 60 | 40 | 20 | 0 | -20 | -20 | -20 | -20 | -20 | -20 |
| | 96 | 84 | 64 | 44 | 24 | 4 | -16 | -16 | -16 | -16 | -16 | -16 |
| | 97 | 88 | 68 | 48 | 28 | 8 | -12 | -12 | -12 | -12 | -12 | -12 |
| | 98 | 92 | 72 | 52 | 32 | 12 | -8 | -8 | -8 | -8 | -8 | -8 |
| | 99 | 96 | 76 | 56 | 36 | 16 | -4 | -4 | -4 | -4 | -4 | -4 |
| | 100 | 100 | 80 | 60 | 40 | 20 | 0 | 0 | 0 | 0 | 0 | 0 |
| | 101 | 100 | 80 | 60 | 40 | 20 | 0 | 0 | 0 | 0 | 0 | 0 |
| | 102 | 100 | 80 | 60 | 40 | 20 | 0 | 0 | 0 | 0 | 0 | 0 |
| | 103 | 100 | 80 | 60 | 40 | 20 | 0 | 0 | 0 | 0 | 0 | 0 |
| | 104 | 100 | 80 | 60 | 40 | 20 | 0 | 0 | 0 | 0 | 0 | 0 |
| | 105 | 100 | 80 | 60 | 40 | 20 | 0 | 0 | 0 | 0 | 0 | 0 |
| | 106 | 100 | 80 | 60 | 40 | 20 | 0 | 0 | 0 | 0 | 0 | 0 |
| | 107 | 100 | 80 | 60 | 40 | 20 | 0 | 0 | 0 | 0 | 0 | 0 |
| | 108 | 100 | 80 | 60 | 40 | 20 | 0 | 0 | 0 | 0 | 0 | 0 |
| | 109 | 100 | 80 | 60 | 40 | 20 | 0 | 0 | 0 | 0 | 0 | 0 |
| | 110 | 100 | 80 | 60 | 40 | 20 | 0 | 0 | 0 | 0 | 0 | 0 |

FIG. 9

COMPENSATION CONTRACT SUPPORTING SYSTEM, METHOD FOR SUPPORTING COMPENSATION CONTRACT, AND PROGRAM THEREOF

CROSS REFERENCE TO RELATED APPLICATIONS

This patent application claims priority from a Japanese patent application No. 2001-046535 filed on Feb. 22, 2001, the contents of which are incorporated herein by reference.

BACKGROUND OF INVENTION

1. Field of the Invention

The present invention relates to a compensation contract supporting system, a method for supporting a compensation contract and a program thereof. More particularly, the present invention relates to a compensation contract supporting system, a method for supporting a compensation contract, and a program thereof that can effectively and easily reduce profit risk for a customer.

2. Description of the Related Art

A business enterprise or a business owner carries various risk factors that influence their profit. This profit risk is different for each corporate structures of the enterprise. For example, an exchange rate is a risk factor that influences the profit of the enterprise that profits from the import and export business. Moreover, the weather, such as temperature or amount of rainfall, may become the risk factor. Furthermore, a factor related to a natural disaster such as an earth quake or a typhoon, a factor related to economic indicators such as GDP (gross domestic product) or unemployment rate, or a factor related to credit risk such as the number of listed bankrupt companies, and the approved numbers of individual bankruptcy may become the risk factor.

The profit risk can be effectively reduced by trading derivatives for the risk factor with a small cash flow. The derivatives belong to the same category of finance with the profit risk such as an interest rates or exchange rate. However, it is difficult to effectively reduce the profit risk, which is created by the risk factors that belong to the other categories, with a small cash flow.

SUMMARY OF INVENTION

Therefore, it is an object of the present invention to provide a compensation contract supporting system, a method for supporting a compensation contract and a program thereof, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a compensation contract supporting system that supports a compensation contract which provides a customer compensation for a profit risk created by a plurality of risk factors that influence a profit of the customer, comprises: a database for storing statistical data of the plurality of risk factors; a first probability calculation unit for calculating a probability, in which a part of the plurality of the risk factors satisfy a predetermined first condition and a probability, in which remaining the plurality of the risk factors satisfy a predetermined second condition using the database, and at least one of the first condition and the second condition being an non-financial condition that is not related to a financial product; and a ratio calculation unit for calculating a ratio between a first compensation amount to be paid or received by the customer when the part of the risk factors satisfy the first condition and a second compensation amount to be paid or received by the customer when the remaining risk factors satisfy the second condition using the probability calculated by the first probability calculation unit.

The first compensation amount may be an amount to be paid to the customer when said part of said risk factors satisfy said first condition, and the second compensation amount may be an amount to be received from the customer when the remaining risk factors satisfy the second condition.

The compensation contract supporting system may further comprise: a correlation calculation unit for calculating a correlation among the plurality of risk factors based on the statistical data read out from the database; wherein: the ratio calculation unit calculates a ratio between the first compensation amount and the second compensation amount using the probability calculated by the first probability calculation unit and the correlation calculated by the correlation calculation unit.

The compensation contract supporting system may further comprise: a second probability calculation unit for calculating a probability in which the first condition, which is to be a base for calculating the first compensation amount, and the second condition, which is to be a base for calculating the second compensation amount, are satisfied at the same time; wherein: the ratio calculation unit calculates the ratio further using the probability calculated by the second probability calculation unit.

The compensation contract supporting system may further comprise: an amount acquiring unit for acquiring any two of the first compensation amount, the second compensation amount, and a prepaid amount, which are requested by the customer, the prepaid amount being an amount to be previously received from the customer or to be previously paid to the customer to cover a difference between a risk created by the first compensation amount and a risk created by the second compensation amount; and an amount calculation unit for calculating remaining one of the first compensation amount, the second compensation amount, and the prepaid amount using the any two of the first compensation amount, the second compensation amount, and the prepaid amount acquired by the amount acquiring unit, and the ratio calculated by the ratio calculation unit.

The compensation contract supporting system may further comprise: a contract database for storing data related to the compensation, which is provided to the customer by the compensation contract supporting system; and a risk calculation unit for calculating a payment-amount-risk involved in a contract, which is concluded via the compensation contract supporting system, using a present value of the risk factors and the contract database.

The compensation contract supporting system may further comprise: a contract database for storing data related to the compensation, which is provided to the customer by the compensation contract supporting system; and a risk calculation unit for calculating a payment-amount-risk created by the compensation provided to the customer by the compensation contract supporting system using the contract database and the first condition or the second condition of the risk factors; wherein:

the ratio calculation unit calculates the ratio using the payment-amount-risk calculated by the risk calculation unit.

The compensation contract supporting system may further comprise a risk factor acquiring unit which acquires information related to the customer from the customer, acquires the risk factors from the database, calculates a correlation between the information and the risk factors, selects the risk factors, the absolute value of the correlation of which is greater than a predetermined value, and outputs the selected risk factors to the first probability calculation unit.

According to the second aspect of the present invention, a compensation contract supporting system that supports a compensation contract which provides a customer compensation for a profit risk created by a risk factor that influences a profit of the customer, comprises: a factor statistics database for storing statistical data of the risk factor; a financial statistics database for storing statistical data of a fluctuation in price of a financial product; a first probability calculation unit for calculating a probability, in which the risk factor satisfies a predetermined first condition, and a probability, in which the price of the financial product satisfies a predetermined second condition, and the first condition being a non-financial condition that is not related to the financial product; and a ratio calculation unit for calculating a ratio between a first compensation amount to be paid or received by the customer when the risk factor satisfies the first condition and a second compensation amount to be paid or received by the customer when the price of the financial product satisfies the second condition using the probability calculated by the first probability calculation unit.

The first compensation amount may be an amount to be paid to the customer when the risk factor satisfies the first condition, and the second compensation amount may be an amount to be received from the customer when the price of the financial product satisfies the second condition.

The compensation contract supporting system may further comprise: a correlation calculation unit for calculating a correlation between the price of the financial product and the risk factor using the financial statistics database and the factor statistics database; wherein: the ratio calculation unit calculates a ratio between the first compensation amount and the second compensation amount using the probability calculated by the first probability calculation unit and the correlation calculated by the correlation calculation unit.

The compensation contract supporting system may further comprise: a second probability calculation unit for-calculating a probability in which the first condition, which is to be a base for calculating the first compensation amount, and the second condition, which is to be a base for calculating the second compensation amount, a re satisfied at the same time; wherein: the ratio calculation unit calculates the ratio further using the probability calculated by the second probability calculation unit.

According to the third aspect of the present invention, a method for supporting a compensation contract that provides a customer compensation for a profit risk created by a risk factor that influences a profit of the customer, comprises: managing statistical data of the risk factor and a fluctuation in price of a financial product; calculating a probability, in which the risk factor satisfies a predetermined first condition, and a probability, in which the price of the financial product satisfies a predetermined second condition, and the first condition being a non-financial condition that is not related to the financial product; calculating a ratio between a first compensation amount to be paid or received by the customer when the risk factor satisfies the first condition and a second compensation amount to be paid or received by the customer when the price of the financial product satisfies the second condition using the calculated probability; acquiring any two of the first compensation amount, the second compensation amount, and a prepaid amount, which are requested by the customer, the prepaid amount being an amount to be previously received from the customer or to be previously paid to the customer to cover a difference between a risk created by the first compensation amount and a risk created by the second compensation amount; and calculating remaining one of the first compensation amount, the second compensation amount, and the prepaid amount using the any two of the first compensation amount, the second compensation amount, and the prepaid amount, and the calculated ratio.

According to the fourth aspect of the present invention, a program for calculating compensation for a fluctuation in a profit created by a plurality of risk factors that influence the profit of the customer, comprises: a first probability calculation module for calculating a probability, in which a part of the plurality of the risk factors satisfy a predetermined first condition and a probability, in which remaining the plurality of risk factors satisfy a predetermined second condition using a database for storing statistical data of the plurality of risk factors, and at least one of the first condition and the second condition being a non-financial condition that is not related to a financial product; and a ratio calculation module for calculating a ratio between a first compensation amount to be paid or received by the customer when the part of the risk factors satisfy the first condition, and a second compensation amount to be paid or received by the customer when the remaining risk factors satisfy the second condition using the probability calculated by the first probability calculation module.

According to the fifth aspect of the present invention, a program for calculating compensation for a fluctuation in profit created by a risk factor that influences a profit of the customer, comprises: a first probability calculation module for calculating a probability, in which the risk factor satisfies a predetermined first condition, using a factor statistics database for storing statistical data of the risk factor and a probability, in which a price of a financial product satisfies a predetermined second condition, using a financial statistics database for storing statistical data of the fluctuation in price of the financial product, and the first condition being a non-financial condition that is not related to the financial product; and a ratio calculation module for calculating a ratio between a first compensation amount to be paid or received by the customer when the risk factor satisfies the first condition and a second compensation amount to be paid or received by the customer when the price of the financial product satisfies the second condition using the probability calculated by the first probability calculation module.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF DRAWINGS

FIG. 2 shows an example of the factor statistics database 220.

FIG. 3 shows an example of the financial statistics database 240.

FIG. 4 shows an example of the contract database 260.

FIG. 9 shows the compensation amount and the receipt amount according to the average temperature and the yen/dollar rate.

DETAILED DESCRIPTION

The invention will now be described based on the preferred embodiments, which do not intend to limit the scope of the present invention, but exemplify the invention. All of the features and the combinations thereof described in the embodiments are not necessarily essential to the invention.

Figure 1:
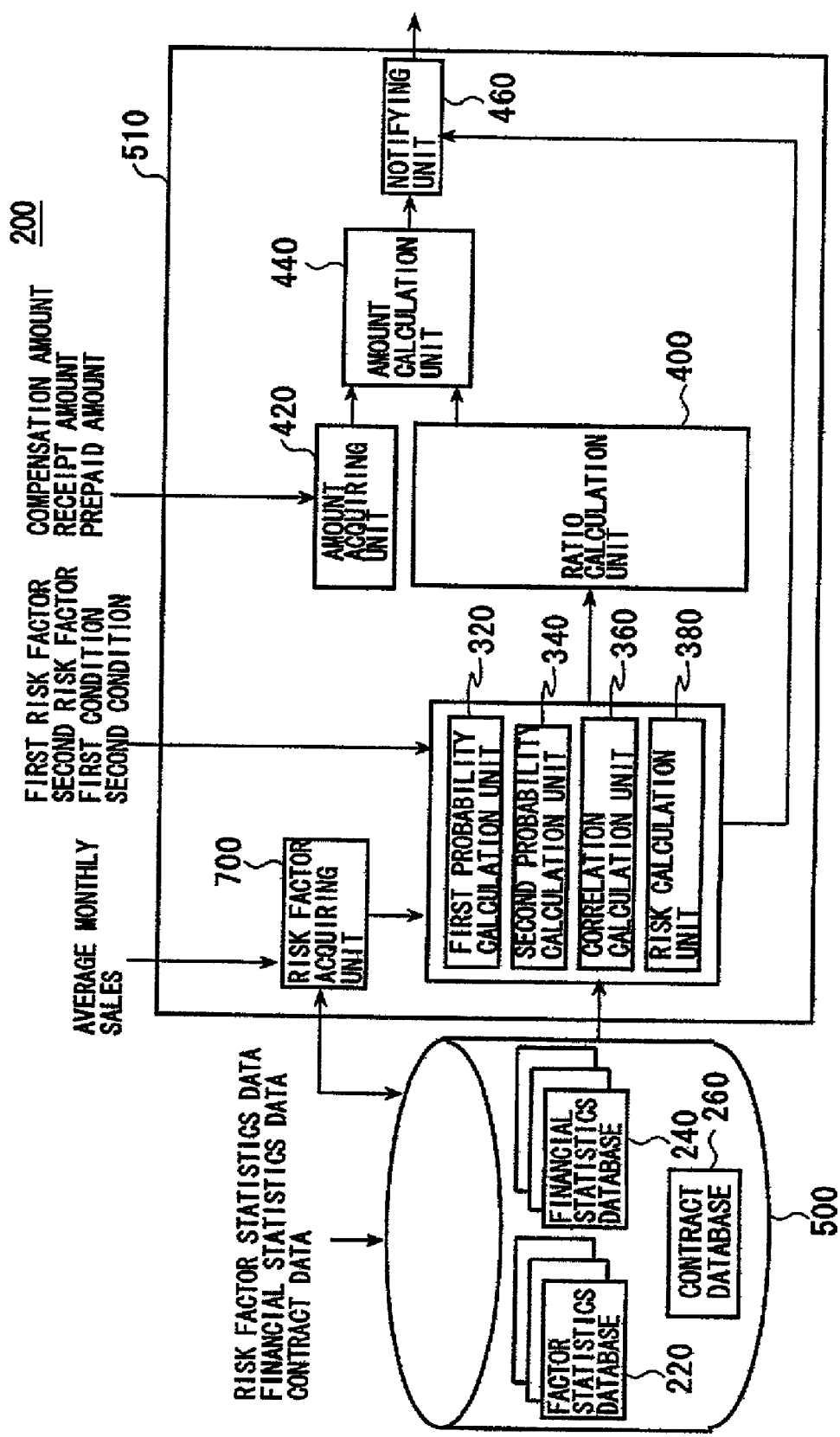
FIG. 1 shows an example of a configuration of a compensation contract supporting system 200 of the present embodiment.

FIG. 1 shows an example of a configuration of a compensation contract supporting system 200 of the present embodiment. The compensation contract supporting system 200 is a system managed by the main contractor who concludes a contract with a customer to provide compensation for profit risk created by a risk factor that influences profit of the customer. An insurance company is one example of a main contractor.

The compensation contract supporting system 200 has a database 500 which includes a factor statistics database 220, a financial statistics database 240, and a contract database 260. The compensation contract supporting system 200 further has a function unit 510 which includes a first probability calculation unit 320, a second probability calculation unit 340, a correlation calculation unit 360, a risk calculation unit 380, a ratio calculation unit 400, an amount-acquiring unit 420, an amount calculation unit 440, a risk factor acquiring unit 700, and a notifying unit 460.

The compensation contract supporting system 200 supports the main contractor such as the insurance company to conclude a contract, in which the first compensation amount to be paid or received by the customer when the first factor satisfies the first condition, and a contract, in which the second compensation amount is paid or received by the customer when the second factor satisfies the second condition, at the same time with the customer.

Preferably, the compensation contract supporting system 200 supports the main contractor to conclude a contract, in which the main contractor pays a first compensation amount to the customer for a profit risk when the first factor satisfies the first condition, and a contract, in which the main contractor receives a second compensation amount from the customer when the second factor satisfies the second condition, at the same time with the customer. In this case, the first compensation is a compensation amount to be paid to the customer by the main contractor when the first factor satisfies the first condition. The second compensation amount is a receipt amount to be received from the customer by the main contractor when the second factor satisfies the second condition.

Furthermore, the first compensation may be an amount to be received from the customer by the main contractor when the first factor satisfies the first condition, and the second compensation amount may be an amount to be paid to the customer by the main contractor when the second factor satisfies the second condition.

Also, the first compensation may be an amount to be paid to the customer by the main contractor when the first factor satisfies the first condition, and the second compensation amount may be an amount to be paid to the customer by the main contractor when the second factor satisfies the second condition. Also, the first compensation may be a compensation amount to be received from the customer by the main contractor when the first factor satisfies the first condition, and the second compensation amount may be an amount to be received from the customer by the main contractor when the second factor satisfies the second condition.

At least one of the first condition and the second condition is a non-financial condition that is not related to a financial product. The first factor is a risk factor or a financial product that influences the profit of the customer such as an enterprise. The second factor is a risk factor or a financial product other than the first factor that influences the profit of the customer.

Because the insurance-setting support apparatus 200 can support the compensation contract explained above, the compensation contract supporting system 200 can support the insurance company to reduce the profit risk effectively with a small cash flow.

Here, each of the first factor and the second factor to be an object of the contract may be single or plural. At least one of the first factor and the second factor is a risk factor other than a financial product. Furthermore, the above-mentioned first and second condition may be determined by designating a threshold value. For example, the first factor satisfies the first condition when the first factor becomes greater or less than the predetermined threshold value. A break-even point can be used as a threshold value.

In case the first and second condition is determined by designating the threshold value, the main contractor can conclude a contract, in which the compensation amount and receipt amount are proportional to the risk factor exceeded from a threshold value, with the customer. Moreover, the data stored in the factor statistics database 220, the financial statistics database 240, and the contract database 260 are added or updated everyday.

The factor statistics database 220 stores statistical data for items that may become a risk factor for the customer. As examples of the risk factors stored in the factor statistics database 220, there are factors related to the weather such as the average temperature in the summer, an annual precipitation, and an annual amount of snowfall, a factor related to natural disasters such as earthquakes or typhoons, a factor related to economic indicators such as GDP (gross domestic product) or unemployment rate, and a factor related to credit risk such as the number of listed bankrupt companies, and the approved numbers of individual bankruptcy. However, the risk factors stored in the factor statistics database 220 are not limited to the factors mentioned above.

FIG. 2 shows an example of the factor statistics database 220. In this example, the factor statistics database 220 has tables for each category of the risk factors. Each table stores the historical data of year/month/date and the actual value of the risk factor corresponded to the year/month/date. For example, the factor statistics database 220 shown in FIG. 2 stores the tables, which contain the risk factor of weather in Tokyo, disasters such as natural disasters and human disasters, and economic indicators.

Examples of natural disasters include the destruction of a city caused by an earthquake, typhoon, volcano eruption, and so on. Examples of human disasters include the destruction of a building caused by terrorism or an accident. The risk factors are not limited to the examples explained above, and other risk factors can be included accordingly. Moreover, the factor statistics database 220 further has tables for each region for the risk factors that change with the location, such as weather.

The factor statistics database 220 may store the statistical data, which contains how many times the risk factor becomes the predetermined value, with the value of the corresponding risk factor. Furthermore, the factor statistics database 220 may store the statistical data, which contains the probability where the risk factor becomes the predetermined value, with the value of the corresponding risk factor.

FIG. 3 shows an example of the financial statistics database 240. The financial statistics database 240 stores the statistical data of a risk factor related to finance such as Yen/Dollar exchange rate, interest rates, and stock prices such as Nikkei stock average. In the present embodiment, the financial statistics database 240 has tables for each of the risk factors related to finance. Each table stores the historical data for each risk factor such as Yen/Dollar exchange rate and Nikkei stock average.

FIG. 4 shows an example of the contract database 260. The contract database 260 stores the results of the compensation contract concluded between the main contractor and the customer via the compensation contract supporting system 200.

In the present embodiment, the contract database 260 has a contract number field, a customer name field, a factor field, and a condition field. The contract number field stores the contract numbers, each of which are different with each other to distinguish the contracts. The customer name field stores the customer name for each customer who concludes a contract with the main contractor. The factor field stores the risk factor or the financial product that becomes the object of the contract information. The risk factor or the financial product is information that specifies the first factor and the second factor. The condition field stores other conditions for each contract. As a specific example of the other conditions, there are the first and second condition, the compensation amount, and the receipt amount as mentioned-above.

Referring back to FIG. 1, the first probability calculation unit 320 calculates the probability, in which the first factor satisfies the first condition, and the probability, in which the second factor satisfies the second condition, using the data obtained from the factor statistics database 220. Then, the first probability calculation unit 320 outputs the calculated probabilities to the ratio calculation unit 400.

The second probability calculation unit 340 calculates the probability, in which the first factor satisfies the first condition and at the same time the second factor satisfies the second condition using the data stored in the factor statistics database 220. The second probability calculation unit 340 outputs the calculated probability to the ratio calculation unit 400. Here, if the number of risk factors of at least one of the first factor and the second factor is plural, the second probability calculation unit 340 calculates the above-mentioned probability for each combination of the plurality of factors.

When the customer does not know what kind of risk factors he or she has, the risk factor acquiring unit 700 acquires the risk factors of the customer. Specifically, the risk factor acquiring unit 700 acquires information related to the customer such as average monthly sales of the customer. Then, the risk factor acquiring unit 700 uses the factor statistics database 220 and the financial statistics database 240 to find out what kind of risk factor is influential to the customer's business.

Specifically, the risk factor acquiring unit 700 calculates the correlation between the average monthly sales of the customer and each of the risk factors acquired from the factor statistics database 220 and the financial statistics database 240.

The risk factor acquiring unit 700 then selects the risk factors, the absolute value of the correlation of which is greater than the predetermined value. Next, the risk factor acquiring unit 700 outputs the selected risk factors to the first probability calculation unit 320 and the second probability calculation unit 340.

The correlation calculation unit 360 calculates the correlation between the first factor and the second factor using the factor statistics database 220. The correlation calculation unit 360 outputs the calculated correlation information, which indicates the correlation between the first factor and the second factor, to the ratio calculation unit 400. Here, if there is a total of three numbers or greater of the first factor and the second factor, the correlation calculation unit 360 calculates the above-mentioned correlation for each combination of the first factor and the second factor.

The risk calculation unit 380 calculates a payment-amount-risk using the contract results data stored in the contract database 260. The payment-amount-risk is a risk carried by the main contractor, which is created by the contract concluded between the main contractor and the customer via the compensation contract supporting system 200. The risk calculation unit 380 then outputs the calculated payment-amount-risk to the ratio calculation unit 400 and the notifying unit 460.

The contents of the payment-amount-risk calculated by the risk calculation unit 380 are different according to the destination of the output. For example, the payment-amount-risk, which is output to the notifying unit 460, includes the compensation amount paid by the main contractor or the receipt amount to be received by the main contractor based on the contract concluded via the compensation contract supporting system 200 for each contract under the present value of each of the risk factors. The payment-amount-risk, which is output to the notifying unit 460, also includes the total amount of the above-mentioned compensation amounts and the receipt amounts under the present value of each of the risk factors.

Furthermore, the payment-amount-risk, which is output to the ratio calculation unit 400, is the total amount of the compensation amount, which is to be paid by the main contractor, or the total amount of the receipt amount, which is to be received by the main contractor, based on the contract concluded via the compensation contract supporting system 200 when each of the first factor and the second factor satisfies the first condition and the second condition, respectively. The compensation amount is an amount to be paid to the customer by the main contractor.

When the main contractor and the customer conclude a new contract, the risk calculation unit 380 calculates the payment-amount-risk carried by the main contractor under the condition of the concluded contract. Then, the risk calculation unit 380 outputs to the ratio calculation unit 400 and the notifying unit 460 the calculated payment-amount-risk. Therefore, the main contractor can recognize the risk, which is carried by the contractor and created by the contract concluded via the compensation contract supporting system 200, by confirming the payment-amount-risk, which is output to the notifying unit 460.

The ratio calculation unit 400 calculates the ratio of the receipt amount, which is to be received from the customer by the main contractor when the second condition satisfies the second condition, to the compensation amount, which is to be paid to the customer by the main contractor when the first factor satisfies the first condition. The ratio calculation unit 400 calculates the ratio using the probability calculated by the first probability calculation unit 320, the probability calculated by the second probability calculation unit 340, the correlation calculated by the correlation calculation unit 360, and the payment-amount-risk calculated by the risk calculation unit 380.

Specifically, the ratio calculation unit 400 decreases the ratio when the probability calculated by the first probability calculation unit 320 is high because the possibility of paying the compensation amount by the main contractor to the customer is high. Contrary, the ratio calculation unit 400 increases the ratio when the probability calculated by the first probability calculation unit 320 is low because the possibility of paying the compensation amount by the main contractor to the customer is low.

Moreover, the ratio calculation unit 400 increases the ratio when the probability calculated by the second probability calculation unit 340 is high because the possibility of receiving the receipt amount from the customer by the main contractor is high at the time of paying the compensation amount to the customer by the main contractor.

Contrary, the ratio calculation unit 400 decreases the ratio when the probability calculated by the second probability calculation unit 340 is low because the possibility of paying the compensation amount to the customer by the main contractor without receiving the receipt amount from the customer is high.

Furthermore, the ratio calculation unit 400 modifies the ratio by the correlation calculated by the correlation calculation unit 360 and the payment-amount-risk calculated by the risk calculation unit 380.

Specifically, the ratio calculation unit 400 decreases the ratio when the correlation calculated by the correlation calculation unit 360 is high because the possibility of paying the compensation amount to the customer by the main contractor without receiving the receipt amount from the customer is high. The correlation calculated by the correlation calculation unit 360 is high when the possibility of the first factor and second factor to influence the profit of the customer in the same direction at the same time is high.

Contrary, the ratio calculation unit 400 increases the ratio when the correlation calculated by the correlation calculation unit 360 is low because the possibility of receiving the receipt amount from the customer by the main contractor at the time of paying the compensation amount to the customer is high. The correlation calculated by the correlation calculation unit 360 is low when the possibility of the first factor and second factor to influence the profit of the customer in the opposite direction at the same time is high.

Moreover, the ratio calculation unit 400 decreases the ratio when the payment-amount-risk carried by the main contractor under the contract condition, the risk of which is created by the compensation to be provided to the customer calculated by the risk calculation unit 380, is high. Contrary, the ratio calculation unit 400 increases the ratio when the payment-amount-risk calculated by the risk calculation unit 380 is low. Thus, the compensation contract supporting system 200 can adjust the ratio by referring to the payment-amount-risk of the other insurance contracts, which have been concluded by the main contractor. Therefore, the main contractor can reduce the total payment-amount-risk carried by the main contractor, which includes the payment-amount-risk of the other insurance contracts concluded by the main contractor.

Therefore, the ratio calculation unit 400 calculates the ratio accurately using the probability calculated by the second probability calculation unit 340, the correlation calculated by the correlation calculation unit 360, and the payment-amount-risk calculated by the risk calculation unit 380.

The amount-acquiring unit 420 acquires any two of a compensation amount, a receipt amount, and a prepaid amount requested by the customer from the outside of the compensation contract supporting system 200. The compensation amount acquired by the amount-acquiring unit 420 is the amount requested by the customer when the first factor satisfies the first condition.

The receipt amount acquired by the amount-acquiring unit 420 is the amount requested by the customer when the second factor satisfies the second condition. The prepaid amount acquired by the amount-acquiring unit 420 is the amount to be previously received from the customer or to be previously paid to the customer by the main contractor to cover the difference between the risk created by the compensation amount and the risk created by the receipt amount.

Specifically, the amount-acquiring unit 420 acquires the compensation amount, the receipt amount, and the prepaid amount requested by the customer from the input device such as a keyboard.

The amount calculation unit 440 uses any two of the compensation amount, the receipt amount, and the prepaid amount acquired by the amount acquiring unit 420 and the ratio calculated by the ratio calculation unit 400 to calculate the remaining one of the compensation amount, the receipt amount, and the prepaid amount. The amount calculation unit 440 outputs the calculated one of the compensation amount, the receipt amount, and the prepaid amount to the notifying unit 460.

Specifically, when the amount-acquiring unit 420 acquires the compensation amount and the receipt amount, the amount calculation unit 440 converts the compensation amount to the receipt amount using the ratio calculated by the ratio calculation unit 400. The amount calculation unit 440 then calculates the prepaid amount using the receipt amount converted from the compensation amount and the receipt amount acquired from the amount-acquiring unit 420.

The notifying unit 460 notifies outside the compensation contract supporting system 200 about the compensation amount, the receipt amount, or the prepaid amount calculated by the amount calculation unit 440 and the risk calculated by the risk calculation unit 380. For example, the notifying unit 460 notifies the customer and the main contractor about the compensation amount and the risk by outputting the compensation amount and the risk to the printer or the display device.

Furthermore, the notifying unit 460 may notify the customer and the main contractor of the compensation amount and the risk by outputting directly the compensation amount and the risk to the terminal of the customer by electronic mail.

Figure 5:
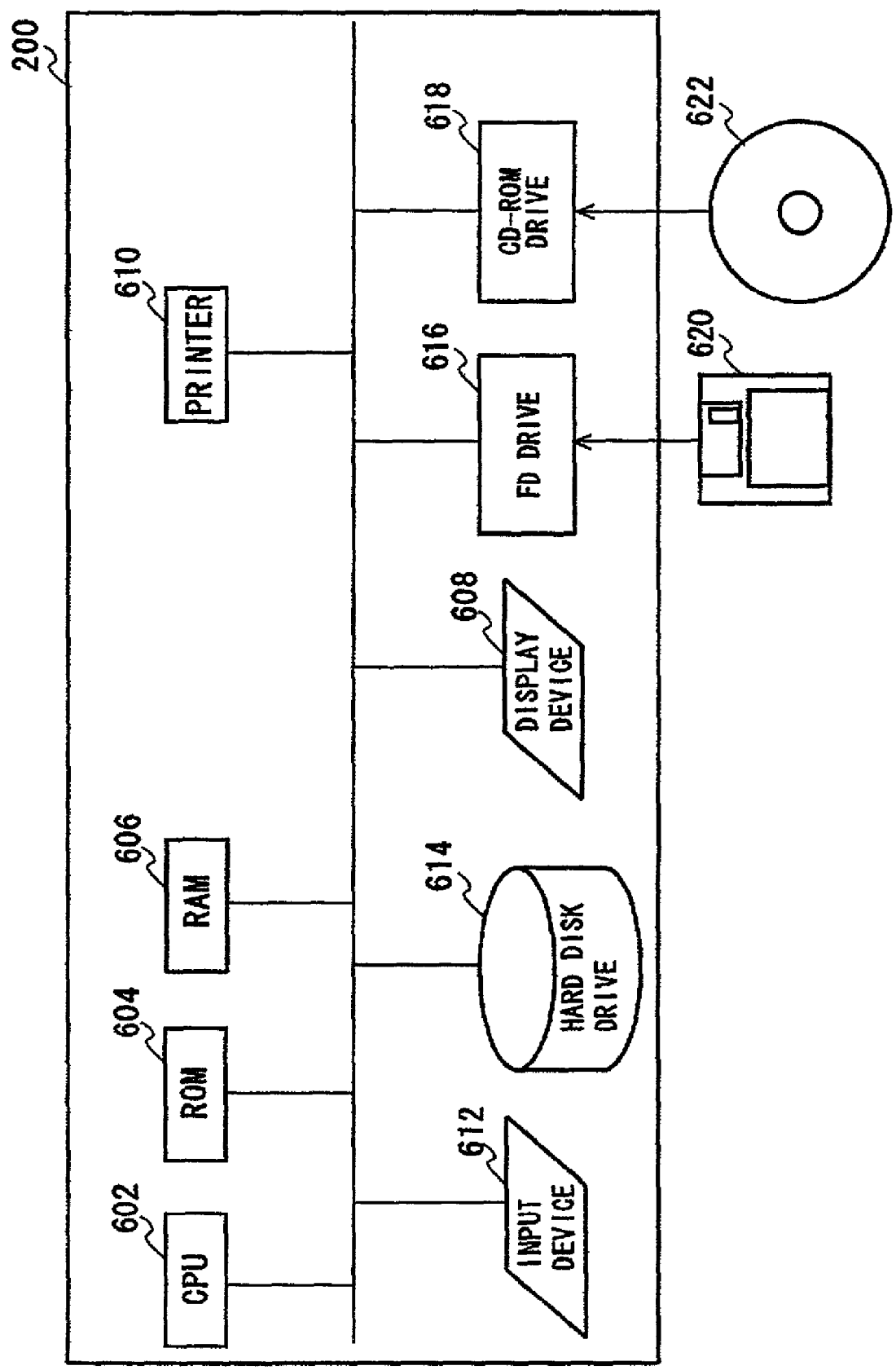
FIG. 5 shows an example of a configuration of hardware of the compensation contract supporting system 200.

FIG. 5 shows an example of a configuration of hardware of the compensation contract supporting system 200. In the present example, the compensation contract supporting system 200 has a CPU (central processing unit) 602, a ROM (read only memory) 604, a RAM (random access memory) 606, a display device 608, a printer 610, an input device 612, a hard disk drive 614, a floppy disk drive 616, and a CDROM (compact disk-read only memory) drive 618.

The CPU 602 processes data based on the program stored in the RAM 606 and ROM 604. The display 608 displays various information provided from the CPU 602.

The printer 610 prints out various information provided from the CPU 602. The input device 612 inputs the information for setting up the compensation contract supporting system 200. The floppy disk drive 616 reads out the data or the program from the floppy disk 620 and outputs to the CPU 602.

The CD-ROM drive 618 reads out the data or the program from the CD-ROM and outputs to the CPU 602. The hard disk drive 618 stores the data or the program, which is read out from the floppy disk drive 616 or the CD-ROM drive 618. The hard disk drive 618 also stores the data, which is made by the CPU 602 while the CPU 602 executes the program. The hard disk drive 618 reads out the data or the program stored in the hard disk drive 618 and outputs to the CPU 602.

In the present embodiment, the CD-ROM 622 stores the program for realizing each function element of the compensation contract supporting system 200 explained in FIG. 1. The CD-ROM drive 618 reads out the program stored in the CD-ROM 622. The CPU 602 installs the program, which is read out from the CD-ROM 622, in the hard disk drive 614. The CPU 602 reads out the program from the hard disk drive 614 and executes the program to realize the function elements of the compensation contract supporting system 200 explained in FIG. 1.

Specifically, the above-mentioned program has a first probability calculation module that realizes the first probability calculation unit 320, the second probability calculation module that realizes the second probability calculation unit 340, the correlation calculation module that realizes the correlation calculation unit 360, the risk calculation module that realizes the risk calculation unit 380, the ratio calculation module that realizes the ratio calculation unit 400, an amount acquiring module that realizes the amount acquiring unit 420, the amount calculation module that realizes the amount calculation unit 440, and the notifying module that realizes the notifying unit 460. Furthermore, the above-mentioned program may be stored on another recording medium other than the CD-ROM 622 such as the floppy disk 620 and a magneto optical disk (MO).

Figure 6:
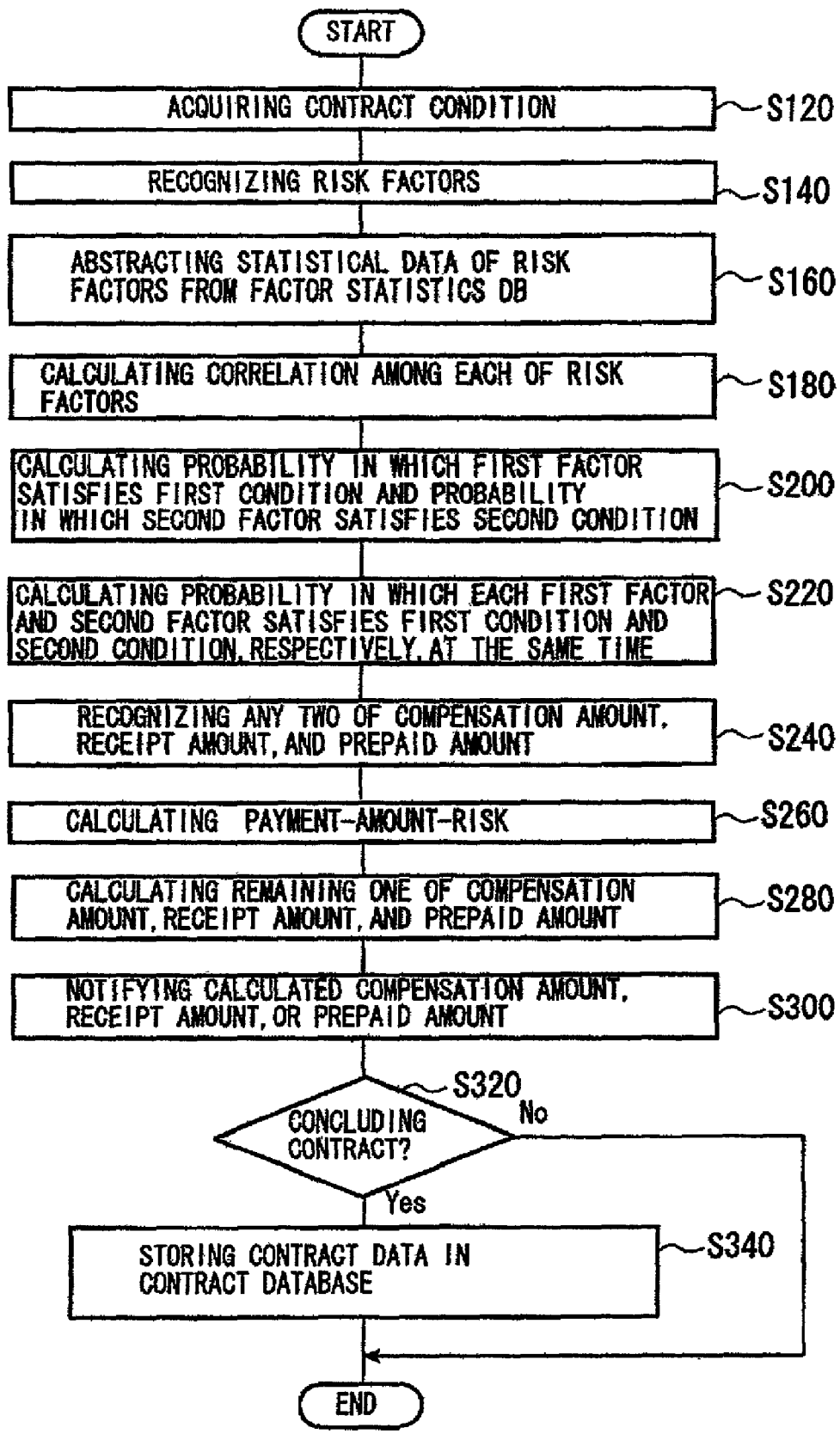
FIG. 6 shows an example of the operation of the compensation contract supporting system 200.

FIG. 6 shows an example of the operation of the compensation contract supporting system 200. The present example shows the operation that supports the compensation contract using the compensation contract supporting system 200.

First, the compensation contract supporting system 200 acquires the contract condition requested by the customer using the amount acquiring unit 420 (S120). The contract condition includes the risk factors, first and second conditions, and any two of the compensation amount, receipt amount, and prepaid amount requested by the customer. Preferably, the first condition is determined such that a compensation amount is paid to the customer when part of the risk factors satisfy the first condition. Also, the second condition is determined such that the main contractor receives the receipt amount from the customer when the remaining risk factors satisfy the second condition.

Then, the compensation contract supporting system 200 recognizes the risk factors, which are to be an object of the contract, as the first factor and the second factor (S140). Then, the compensation contract supporting system 200 extracts the statistical data related to the first factor and the second factor from the factor statistics database 220 (S160).

The compensation contract supporting system 200 then calculates the correlation among the risk factors that constitute the first factor and the second factor using correlation calculation unit 360 (S180). Next, the compensation contract supporting system 200 calculates the probability, in which the first factor satisfies the first condition, and the probability, in which the second factor satisfies the second condition, using the first probability calculation unit 320 (S200).

The compensation contract supporting system 200 further calculates the probability, in which the first factor satisfies the first condition and at the same time the second factor satisfies the second condition using the second probability calculation unit 340 (S220). Then, the compensation contract supporting system 200 recognizes any two of the compensation amount, the receipt amount, and the prepaid amount acquired from the amount-acquiring unit 420 (S240).

Then, the compensation contract supporting system 200 calculates the payment-amount-risk created by the contract concluded via the compensation contract supporting system 200 when the first condition or the second condition are satisfied using risk calculation unit 380 (S260). The order of the operations from the correlation calculation step (S180) to the payment-amount-risk calculation step (S260) is not limited to the order mentioned above, and the order of the operations can be desirably changed.

Next, the compensation contract supporting system 200 calculates remaining one of the compensation amount, the receipt amount, and the prepaid amount, which is not requested by the customer, using the amount calculation unit 440 (S280). Then, the compensation contract supporting system 200 notifies outside the compensation contract supporting system 200 about the calculated one of the compensation amount, the receipt amount, or the prepaid amount using the notifying unit 460 (S300).

When the contract is concluded (S320), the compensation contract supporting system 200 stores the contract data such as the compensation amount, the receipt amount, and the prepaid amount with the corresponding contract number into the contract database 260 (5340) and finishes the operations.

Figure 7:
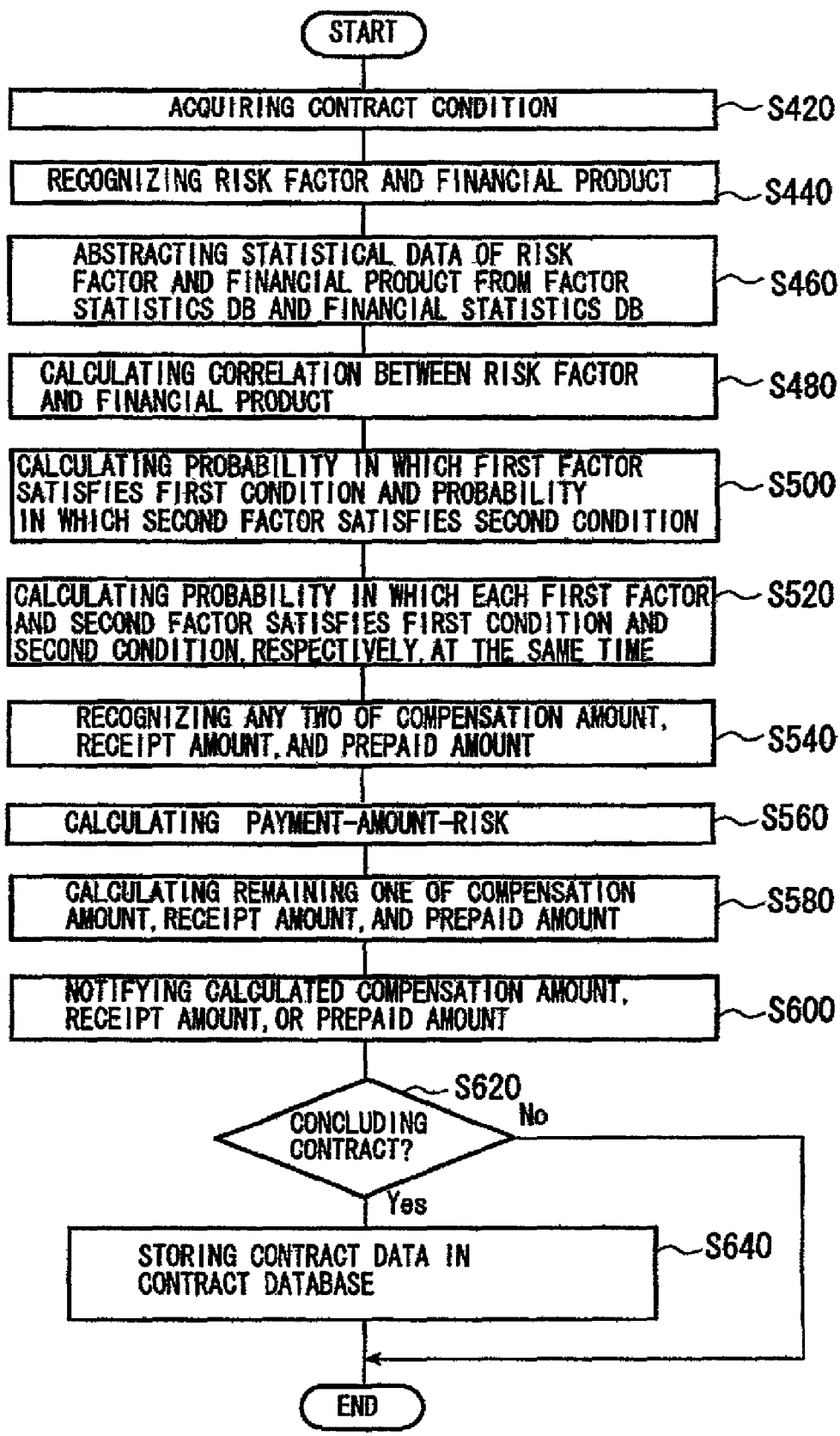
FIG. 7 shows another example of the operation of the compensation contract supporting system 200.

FIG. 7 shows another example of the operation of the compensation contract supporting system 200. The present example shows the operation that supports the compensation contract using the compensation contract supporting system 200.

First, the compensation contract supporting system 200 acquires the contract condition requested by the customer using the amount acquiring unit 420 (S420). The contract condition includes risk factor and financial product, first and second conditions, and any two of the compensation amount, receipt amount, and prepaid amount requested by the customer. Preferably, the first condition is determined such that a compensation amount is paid to the customer by the main contractor when the risk factor satisfies the first condition. Also, the second condition is determined such that the main contractor receives a receipt amount from the customer when the price of the financial product satisfies the second condition.

Then, the compensation contract supporting system 200 recognizes the risk factor and the financial product, which are to be an object of the contract, as the first factor and the second factor (S440). Then, the compensation contract supporting system 200 extracts the statistical data related to the first factor and the second factor from the factor statistics database 220 and the financial statistics database 240 (S460).

The compensation contract supporting system 200 then calculates the correlation between the risk factor and the financial product that constitute the first factor and the second factor using correlation calculation unit 360 (S480). Next, the compensation contract supporting system 200 calculates the probability, in which the first factor satisfies the first condition, and the probability, in which the second factor satisfies the second condition, using the first probability calculation unit 320 (S500).

The compensation contract supporting system 200 further calculates the probability, in which the first factor satisfies the first condition and at the same time the second factor satisfies the second condition using the second probability calculation unit 340 (S520). Then, the compensation contract supporting system 200 recognizes any two of the compensation amount, the receipt amount, and the prepaid amount acquired from the amount-acquiring unit 420 (S540).

Then, the compensation contract supporting system 200 calculates the payment-amount-risk created by the contract concluded via the compensation contract supporting system 200 when the first condition or the second condition are satisfied using risk calculation unit 380 (S560). The order of the operations from the correlation calculation step (S480) to the payment-amount-risk calculation step (S560) is not limited to the order mentioned above, and the order of the operations can be desirably changed.

Next, the compensation contract supporting system 200 calculates the remaining one of the compensation amount, the receipt amount, and the prepaid amount, which is not requested by the customer, using the amount calculation unit 440 (S580). Then, the compensation contract supporting system 200 notifies outside the compensation contract supporting system 200 about the calculated one of the compensation amount, the receipt amount, or the prepaid amount using the notifying unit 460 (S600).

When the contract is concluded (S620), the compensation contract supporting system 200 stores the contract data such as the compensation amount, the receipt amount, and the prepaid amount with the corresponding contract number into the contract database 260 (S640) and finishes the operations.

As a specific example, the case is considered when the amount acquiring unit 420a acquires the contract condition requested by the customer explained below in the step of acquiring the contract condition (S420). An electric company as a customer requests an insurance company as a main contractor to conclude a compensation contract for the risk factor of an average temperature and the price of the financial product of yen/dollar exchange rate.

The electric company requests the first condition such that if the average temperature becomes lower than 25 degree in Tokyo from Jun. 1, 2002 to Sep. 30, 2002, the insurance company pays the receipt amount of 20 million yen according to the degree of the temperature smaller than 25 degree for 1 degree to the electric company. The electric company requests this first condition because the profit of the electric company is greatly reduced owing to the decrease in power consumption if the temperature is low during the summer season. The maximum compensation amount is 1 hundred million yen, which is paid to the electric company when the average temperature in Tokyo from Jun. 1, 2002 to Sep. 30, 2002 is lower than 20 degree.

The electric company also requests the second condition such that if the yen/dollar rate becomes lower than the strike price of 100 yen from Jun. 1, 2002 to Sep. 30, 2002, the electric company pays the receipt amount according to the rate lower than 100 yen to the electric company because the amount paid in yen for crude oil purchased by the electric company decreases according to the decrease of the yen/dollar rate. The maximum receipt amount is 40 million yen, which is paid to the insurance company when the yen/dollar rate at the date determined in the contract is 90 yen or lower.

Then, the compensation contract supporting system 200 recognizes the risk factor of an average temperature and the financial product of exchange rate as the first factor and the second factor (S440). Then, the compensation contract supporting system 200 extracts the statistical data related to the average temperature and the yen/dollar rate from the factor statistics database 220 and the financial statistics database 240 (S460). The compensation contract supporting system 200 then calculates the correlation between the average temperature and the yen/dollar rate using correlation calculation unit 360 (S480).

Figure 8:
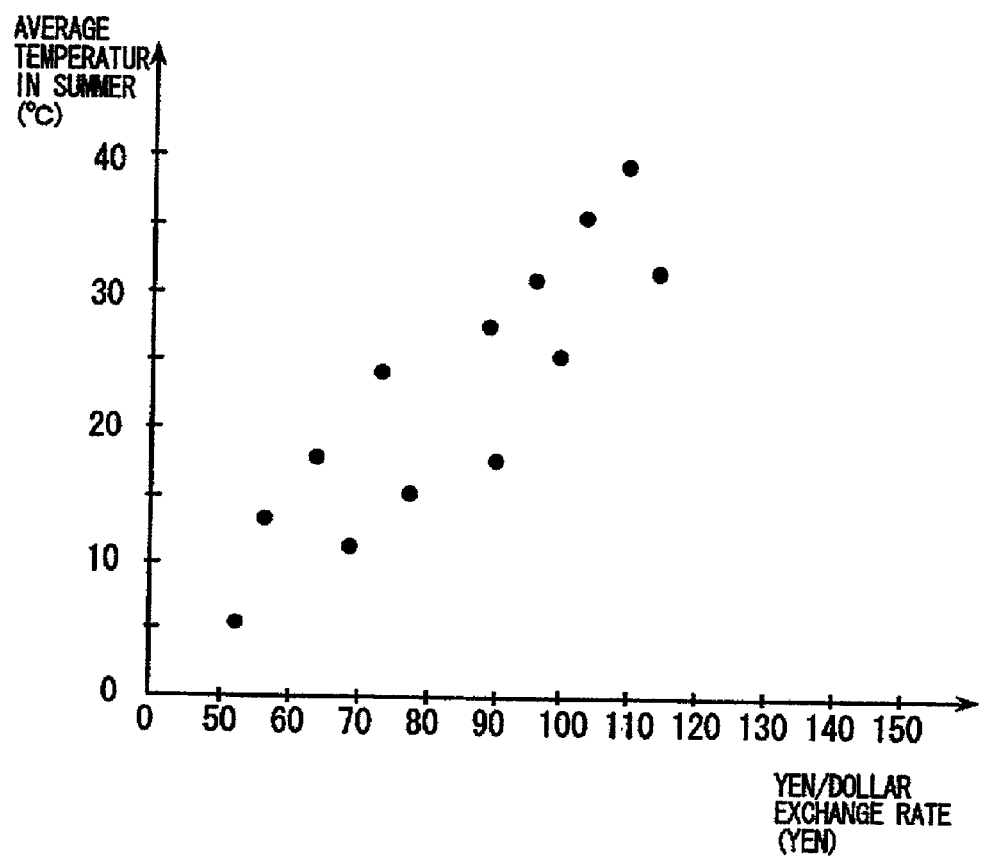
FIG. 8 shows one example of correlation between the average temperature and the yen/dollar exchange rate.

FIG. 8 shows one example of correlation between the average temperature and the yen/dollar exchange rate. The correlation between the average temperature and the yen/dollar exchange rate at the same date is calculated. In FIG. 8, the value of the average temperature and the value of the yen/dollar exchange rate at the same date are plotted for a plurality of data. There is a positive correlation between the average temperature and the yen/dollar exchange rate.

Next, the compensation contract supporting system 200 calculates the probability, in which the first factor satisfies the first condition, and the probability, in which the second factor satisfies the second condition, using the first probability calculation unit 320 (S500).

The compensation contract supporting system 200 further calculates the probability, in which the first factor satisfies the first condition and at the same time the second factor satisfies the second condition using the second probability calculation unit 340 (S520). Then, the amount acquiring unit 420 acquires the compensation amount and the receipt amount requested by the electric company (S540).

Then, the compensation contract supporting system 200 calculates the payment-amount-risk created by the contract concluded via the compensation contract supporting system 200 when the first condition or the second condition are satisfied using risk calculation unit 380 (S560). Next, the compensation contract supporting system 200 calculates the prepaid amount using the amount calculation unit 440 (S580).

The amount calculation unit 440 calculates the prepaid amount from the compensation amount, the receipt amount, and the calculated ratio.

Thus, the electric company can reduce the prepaid amount, which is to be paid to the insurance company, by combining the compensation contract for the temperature and the yen/dollar exchange rate. Then, the compensation contract supporting system 200 notifies the electric company and the insurance company about the calculated prepaid amount using the notifying unit 460 (S600).

FIG. 9 shows the compensation amount and the receipt amount according to the average temperature and the yen/dollar rate. The unit of the numerals shown inside FIG. 9 is one million yen. If the sign of the numeral is positive, it is an amount to be paid to the electric company from the insurance company. If the sign of the numerical is negative, it is an amount to be paid to the insurance company from the electric company.

As shown in FIG. 9, if the average temperature becomes lower than 25 degree and if the yen/dollar rate becomes higher than the strike price of 100 yen, the insurance company pays the receipt amount of 20 million yen according to the degree of temperature lower than 25 degree for 1 degree to the electric company. If the average temperature is 25 degree or higher and if the yen/dollar rate becomes lower than the strike price of 100 yen, the electric company pays the receipt amount to the insurance company.

If the yen/dollar rate becomes higher than the strike price of 100 yen, and the average temperature is 25 degree or higher, neither the insurance company nor the electric company pays the compensation amount or receipt amount. Furthermore, if the yen/dollar rate becomes lower than the strike price of 100 yen, and the average temperature is lower than 25 degree, the compensation amount or the receipt amount is a net amount of the compensation amount and the receipt amount.

For example, if the average temperature is 20 degree, the compensation amount is 100 million yen, and if the yen/dollar exchange rate is 90 yen, the receipt amount is 40 million yen. Therefore, the net amount of the compensation amount and the receipt amount is 60 million yen, which is a compensation amount to be paid to the electric company from the insurance company. Furthermore, if the average temperature is 24 degree, the compensation amount is 20 million yen, and if the yen/dollar exchange rate is 91 yen, the receipt amount is 36 million yen. Therefore, the net amount of the compensation amount and the receipt amount is 16 million yen, which is a receipt amount to be paid to the insurance company from the electric company.

When low average temperature and a low yen/dollar rate occur at the same time during the contract period, the insurance company pays the compensation amount to the electric company, and at the same time, the electric company pays the receipt amount to the insurance company. Thus, the risk of paying a large amount of compensation is reduced for the insurance company. Also, the electric company can obtain the insurance for the average temperature with a small amount of the prepaid amount.

In the above-mentioned contract concluded via the compensation contract supporting system 200, the only cash flow necessary at the time of contract is the prepaid amount. Therefore, the main contractor and the customer can easily conclude the contract that can effectively reduce the profit risk created by the risk factor, which does not belong to the category of finance, with a small cash flow using the compensation contract supporting system 200.

Although the present invention has been described by way of exemplary embodiments, it should be understood that those skilled in the art might make many changes and substitutions without departing from the spirit and the scope of the present invention, which is defined only by the appended claims.

The invention claimed is:

1. A compensation contract supporting system that supports a compensation contract which provides a customer compensation for a profit risk created by a plurality of risk factors that influence a profit of said customer, comprising:
   a central processing unit (CPU);
   a database for storing statistical data of said plurality of risk factors according to instructions from said CPU;
   a first probability calculation unit for calculating a probability that a part of said plurality of risk factors satisfy a predetermined first condition related to profit and loss, and a probability that a remaining part of said plurality of risk factors satisfy a predetermined second condition related to profit and loss, using said database, at least one of said plurality of risk factors being a non-financial risk factor that is not related to a financial product, according to instructions from said CPU; and
   a ratio calculation unit for calculating a ratio between a first compensation amount to be paid or received by said customer when said part of said risk factors satisfy said predetermined first condition and a second compensation amount to be paid or received by said customer when said remaining part of said risk factors satisfy said predetermined second condition using said probabilities calculated by said first probability calculation unit, according to instructions from said CPU.

2. The compensation contract supporting system as claimed in claim 1, wherein said first compensation amount is an amount to be paid to said customer when said part of said risk factors satisfy said predetermined first condition, and said second compensation amount is an amount to be received from said customer when said remaining part of said risk factors satisfy said predetermined second condition.

3. The compensation contract supporting system as claimed in claim 1, further comprising:
   a correlation calculation unit for calculating a correlation among said plurality of risk factors based on said statistical data read out from said database,
   wherein said ratio calculation unit calculates a ratio between said first compensation amount and said second compensation amount using said probabilities calculated by said first probability calculation unit and said correlation calculated by said correlation calculation unit.

4. The compensation contract supporting system as claimed in claim 1, further comprising:
   a second probability calculation unit for calculating a probability that said predetermined first condition, which is to be a base for calculating said first compensation amount, and said predetermined second condition, which is to be a base for calculating said second compensation amount, are satisfied at the same time,
   wherein said ratio calculation unit calculates said ratio further using said probability calculated by said second probability calculation unit.

5. The compensation contract supporting system as claimed in claim 1, further comprising:
   an amount acquiring unit for acquiring any two of said first compensation amount, said second compensation amount, and a prepaid amount, which are requested by said customer, said prepaid amount being an amount to be previously received from said customer or to be previously paid to said customer to cover a difference between a risk created by said first compensation amount and a risk created by said second compensation amount; and
   an amount calculation unit for calculating the remaining one of said first compensation amount, said second compensation amount, and said prepaid amount using any two of said first compensation amount, said second compensation amount, and said prepaid amount acquired by said amount acquiring unit, and said ratio calculated by said ratio calculation unit.

6. The compensation contract supporting system as claimed in claim 1, further comprising:
   a contract database for storing data related to said compensation, which is provided to said customer by the compensation contract supporting system; and
   a risk calculation unit for calculating a payment-amount-risk involved in a contract, which is concluded via said compensation contract supporting system, using a present value of said risk factors and said contract database.

7. The compensation contract supporting system as claimed in claim 1, further comprising:
   a contract database for storing data related to said compensation, which is provided to said customer by the compensation contract supporting system; and
   a risk calculation unit for calculating a payment-amount-risk created by the compensation provided to said customer by the compensation contract supporting system using said contract database and said predetermined first condition or said predetermined second condition of said risk factors,
   wherein said ratio calculation unit calculates said ratio using said payment-amount-risk calculated by said risk calculation unit.

8. The compensation contract supporting system as claimed in claim 1, further comprising a risk factor acquiring unit which acquires information related to said customer from said customer, acquires said risk factors from said database, calculates a correlation between said information and said risk factors, selects the risk factors, an absolute value of said correlation of which is greater than a predetermined value, and outputs said selected risk factors to said first probability calculation unit.

9. The compensation contract supporting system as claimed in claim 1, wherein whether said predetermined first condition is satisfied is based on a first break-even point and whether said predetermined second condition is satisfied is based on a second break-even point.

10. A method for supporting a compensation contract that provides a customer compensation for a profit risk created by a plurality of risk factors that influence a profit of said customer, using a computer device having a central processing unit (CPU), said CPU causing said computer to perform steps comprising:

managing statistical data of said plurality of risk factors;

calculating by the computer device a probability that a part of said plurality of risk factors satisfy a predetermined first condition related to profit and loss, and a probability that a remaining part of said plurality of risk factors satisfy a predetermined second condition related to profit and loss, at least one of plurality of said risk factors being a non-financial risk factor that is not related to a financial product;

calculating by the computer device a ratio between a first compensation amount to be paid or received by said customer when said part of risk factors satisfy said predetermined first condition and a second compensation amount to be paid or received by said customer when said remaining part of risk factors satisfy said predetermined second condition using said calculated probabilities;

acquiring by the computer device any two of said first compensation amount, said second compensation amount, and a prepaid amount, which are requested by said customer, said prepaid amount being an amount to be previously received from said customer or to be previously paid to said customer to cover a difference between a risk created by said first compensation amount and a risk created by said second compensation amount;

calculating by the computer device a remaining one of said first compensation amount, said second compensation amount, and said prepaid amount using said any two of said first compensation amount, said second compensation amount, and said prepaid amount, and said calculated ratio; and outputting by the computer device said remaining one of said first compensation amount, said second compensation amount, and said prepaid amount.

11. The method as claimed in claim 10, wherein whether said predetermined first condition is satisfied is based on a first break-even point and whether said predetermined second condition is satisfied is based on a second break-even point.

12. A computer program product having computer instructions for calculating compensation for a fluctuation in a profit created by a plurality of risk factors that influence said profit, recorded on a computer readable medium, for enabling a computer executing the computer instructions to perform operations comprising:

calculating a probability that a part of said plurality of said risk factors satisfy a predetermined first condition related to profit and loss, and a probability that a remaining part of said plurality of said risk factors satisfy a predetermined second condition related to profit and loss, using a database for storing statistical data of said plurality of risk factors, at least one of said plurality of said risk factors being a non-financial risk factor that is not related to a financial product; and calculating a ratio between a first compensation amount to be paid or received by said customer when said part of said risk factors satisfy said predetermined first condition, and a second compensation amount to be paid or received by said customer when said remaining part of said risk factors satisfy said predetermined second condition using said probabilities.

13. The computer program product as claimed in claim 12, wherein whether said predetermined first condition is satisfied is based on a first break-even point and whether said predetermined second condition is satisfied is based on a second break-even point.

* * * * *